United States Patent [11] 3,597,949

| [72] | Inventor | Gus T. Nigrelli |
| | | 8871 19th Ave., Brooklyn, N.Y. 11214 |
| [21] | Appl. No. | 32,555 |
| [22] | Filed | Apr. 28, 1970 |
| [45] | Patented | Aug. 10, 1971 |

[54] ANTITHEFT LOCK DEVICE
10 Claims, 9 Drawing Figs.

[52] U.S. Cl. ............................................. 70/422, 70/1.5
[51] Int. Cl. ...................................... E05b 15/16, E05b 63/00
[50] Field of Search .......................... 70/1.5, 410, 416, 422

[56] References Cited
UNITED STATES PATENTS

| 1,188,846 | 6/1916 | Segal | 70/422 |
| 2,004,434 | 6/1935 | Fitzgerald | 70/1.5 |
| 3,041,866 | 7/1962 | Segal | 70/1.5 |
| 3,058,333 | 10/1962 | White | 70/1.5 |

Primary Examiner—Ian A. Calvert
Assistant Examiner—Edward J. McCarthy
Attorney—Polachek & Saulsbury ABSTRACT: A vehicle trunk-locking system having a latching mechanism and including a frangible tail extension member coupled to a lock cylinder, the tail extension being adapted to engage the latching mechanism to operate a locking latch. Unauthorized removal of a lock cylinder from the vehicle will fracture the tail extension member leaving a portion thereof within the latching mechanism to thereby prevent insertion of an instrument into the latching mechanism for operating the locking latch.

Patented Aug. 10, 1971

INVENTOR
GUS T. NIGRELLI

BY Polachek & Saulsbury

ATTORNEYS

Patented Aug. 10, 1971
3,597,949
2 Sheets-Sheet 2
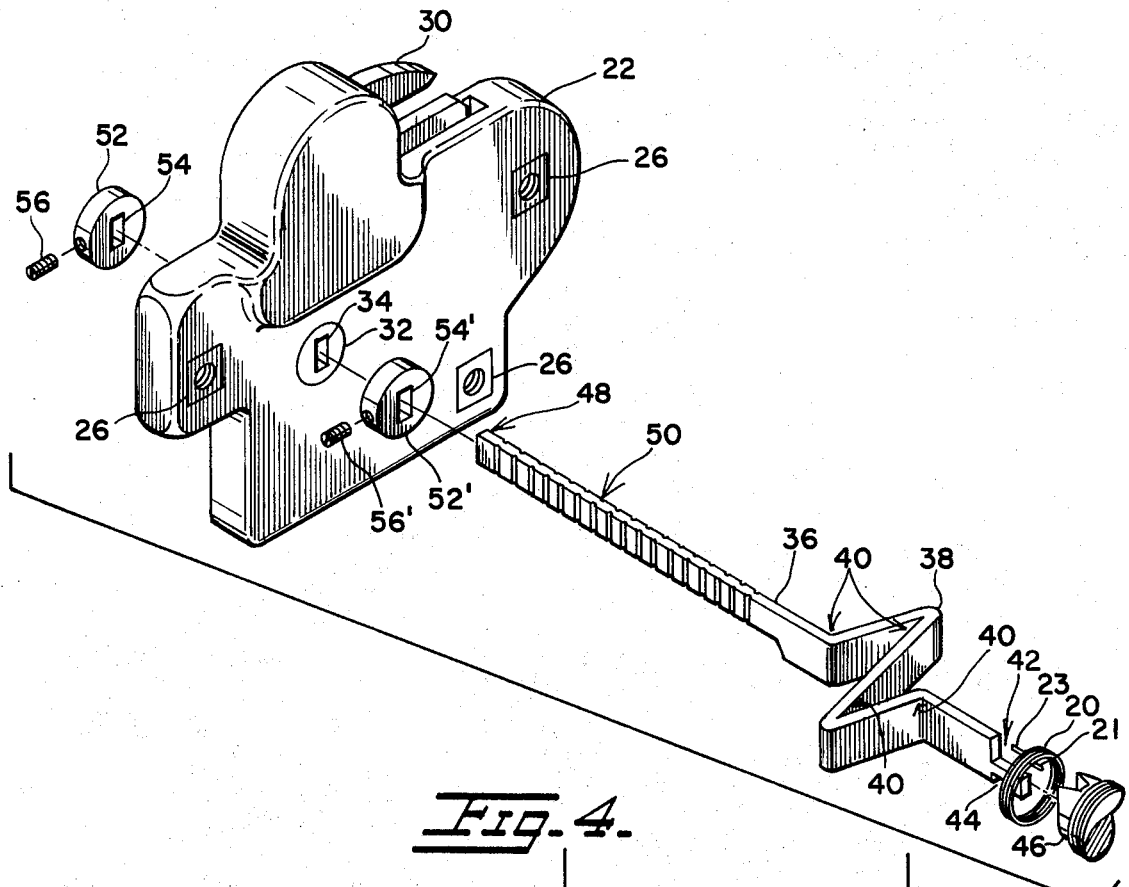
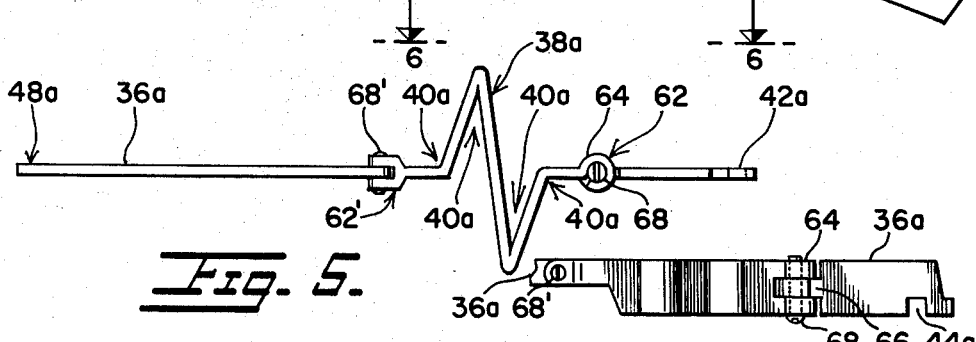
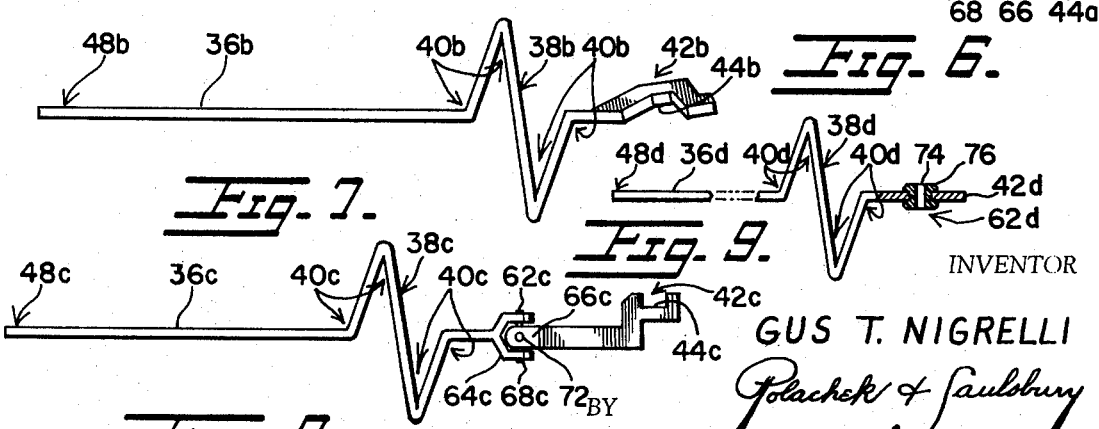
INVENTOR
GUS T. NIGRELLI
Polachek & Saulsbury
BY
ATTORNEYS

ANTITHEFT LOCK DEVICE

This invention relates to an antitheft locking device particularly adaptable for use with a vehicle trunk-locking system.

The antitheft lock device was developed for preventing the unauthorized opening of a vehicle trunk, particularly a vehicle such as a conventional automobile, and the removing of the articles that may be stored therein. It is quite evident that the frequency and number of automobile burglaries is ever increasing. As a consequence, this device was developed to thwart attempts of burglarizing automobile trunks and removing the contents therein.

The conventional trunk-locking system consists basically of a trunk-latching mechanism usually mounted to the trunk lid or to the automobile body and contains a locking latch adapted to engage a hooklike or latch-receiving projection, when the list is in a closed position. A lock cylinder, usually mounted within a housing, will project through the outer surface of the vehicle sheet metal and access to the lock cylinder is provided through an exposed keyway opening. The lock cylinder includes a tail extension member which is coupled to and projects from the back end of the lock cylinder to engage the trunk-latching mechanism usually spaced a distance from the lock cylinder.

A locked trunk lid may be opened by a key placed in the exposed keyway. The key will rotate the lock cylinder; this movement will be translated to the tail extension member; this member will, in turn rotate a latch release in the latching mechanism and thereby release the locking latch portion from the latch-receiving projection.

A burglar desiring to open a trunk lid in a quick and expeditious manner may remove the lock cylinder and housing by grasping the portion of the housing extending on the outer surface of the automobile body with a pliers or other clamping tool and pull the cylinder away from and out of the sheet metal lid. In order to facilitate the removal of the cylinder housing, holes are sometimes drilled in the sheet metal peripherally surrounding the housing, or a screwdriver or other sharp instrument may be pushed through the sheet metal to weaken same. When the housing is removed, the lock cylinder and tail extension member attached to the cylinder will be removed. Insertion of a screwdriver or similar tool through the remaining housing opening and into the latch release will serve as a substitute for the tail extension member and will permit release of the locking latch.

One of the essential features of this invention which is considered to be a distinct improvement over prior art locking devices, is the use of a frangible tail extension member. Previously vehicle trunk-locking systems have employed a tail extension member made either of steel or other like metal chosen basically for its durability and strength. However, it has been found that if a portion of the tail extension member fractures and remains within the latch release after the cylinder housing has been removed as herein described, a screwdriver or other similar tool cannot be inserted into the latch release to operate the locking latch.

In order to insure that a portion of the tail extension will remain in the latch release, the tail extension member is securely anchored after insertion into the latch release; additionally the member is fabricated from a frangible material designed to fracture under a predetermined tensile load. It should thus be evident that when an axially directed force is exerted on the lock cylinder housing to remove same, this force will be transferred to the tail extension member and will cause same to fracture with the result that the portion of the member will remain anchored within the latch release.

The use of a frangible tail extension member as a component part of an antitheft lock system can be fully utilized in any environment where a similar locking arrangement is used, i.e. a lock cylinder is spaced from the latch and connected thereto by a tail member, and should not be considered as applicable solely to vehicle trunk-locking arrangements.

An object therefore of this invention is to provide an antitheft lock device suitable for use within a vehicle trunk-locking system wherein unauthorized operation of the latching mechanism is prevented.

It is another object of this invention to provide a frangible tail extension member within a locking system such that when the lock cylinder housing is forcibly removed for unauthorized entry the frangible tail extension will fracture and a portion thereof will remain inserted within the latch release to prevent manipulation of the latch.

An additional object of this invention is to provide a frangible tail extension member having a pivotal connection therein for providing the freedom of movement necessary to align the lock cylinder and the latching mechanism.

Other objects and advantages of this invention will be apparent from the following description made with reference to the drawings, wherein:

FIG. 1 presents a perspective view of the rear of an automobile showing a lock cylinder housing in the outer surface of the automobile body.

FIG. 4 is an exploded view of the trunk-latching mechanism, frangible tail extension member and the back portion of the cylinder housing; also shown are clamping rings and setscrews for retaining the tail extension member within the latching mechanism after fracture.

FIG. 5 is a top plan view of an alternate embodiment of the frangible tail extension member wherein pivotal connections have been provided for increased freedom of movement and to permit operation when the lock cylinder and the latching mechanism are disaligned.

FIG. 6 is an auxiliary view taken along the line 6–6 of FIG. 5 showing one of the pivotal connections in elevation.

FIG. 7 is a top plan view of another embodiment of the frangible tail extension member wherein a notch has been provided in the forward (cylinder) end and the member has been canted in the area of the notch.

FIG. 8 is a top plan view of a further embodiment of the frangible tail extension showing a universal joint pivotal connection.

FIG. 9 is a top plan view of yet another embodiment of the frangible tail extension member.

Figure 1:
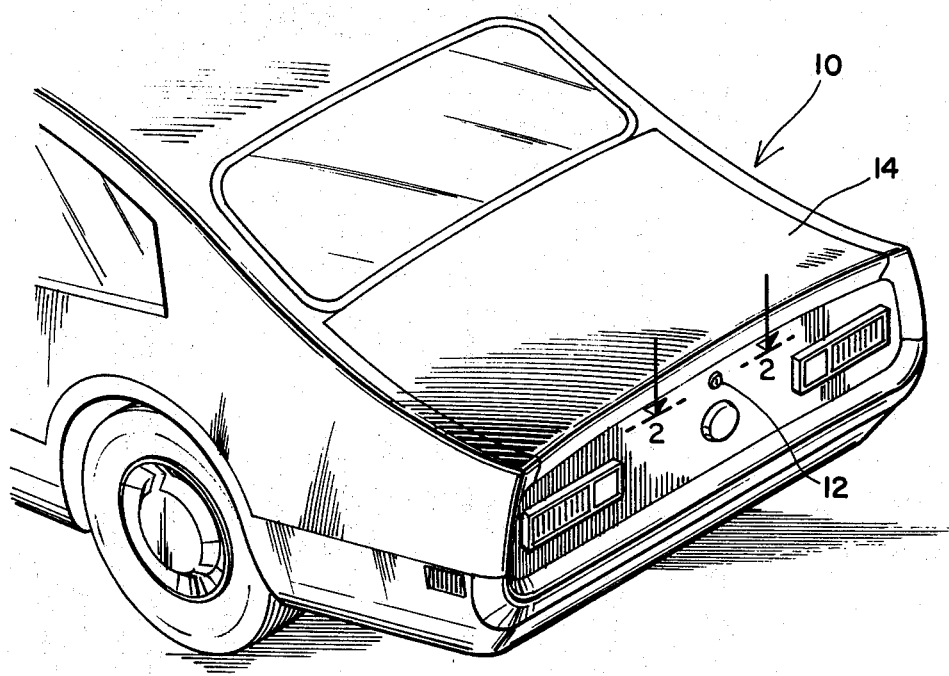
Figure 2:
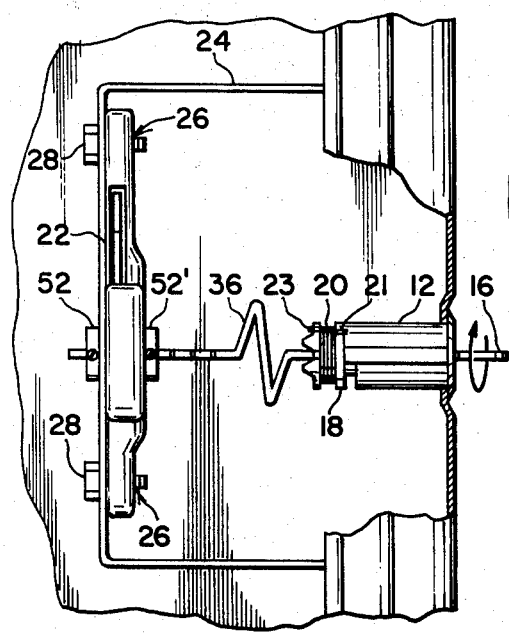
FIG. 2 is a fragmentary enlarged cross-sectional view taken along the line 2–2 of FIG. 1 showing a frangible tail extension constructed in accordance with the invention in its operable position interconnecting a cylinder and a latch.
Figure 3:
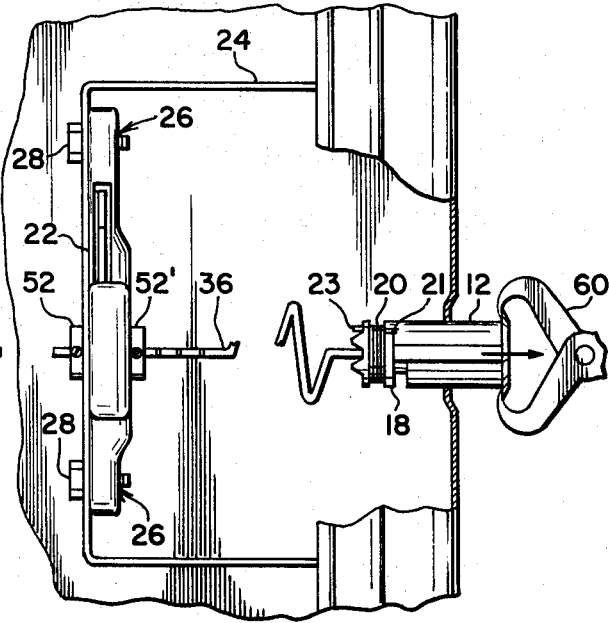
FIG. 3 is a cross-sectional view similar to that of FIG. 2 however the lock cylinder and housing have been axially displaced, and the frangible tail extension member has fractured leaving a distal portion thereof within the latching mechanism.

The antitheft lock device of this invention will be described in typical application as in connection with the trunk-locking mechanism of an automobile. FIG. 1 shows a perspective view of the rear deck of an automobile, the reference numeral 10 indicating generally the rear trunk portion. The lock cylinder housing is indicated by reference numeral 12 and the trunk lid being indicated by numeral 14. The insertion of a key 16 (see FIG. 2) within the lock cylinder housing 12 will permit rotation of a lock cylinder 18 against the bias of a helical coil spring 20. One end 21 of the spring 20 abuts the cylinder housing 12 while the other end 23 abuts the cylinder 18 (see FIG. 2).

A trunk-latching mechanism 22 is mounted to the trunk lid 14 or alternatively may be mounted to the rear deck by a mounting bracket 24. Boltholes 26 are provided in the trunk-latching mechanism and bolts 28 are used to secure the trunk-latching mechanism 22 to the mounting bracket 24.

The trunk-latching mechanism 22 (see FIG. 4) is provided with a pivotable locking latch 30; said latch being adapted to engage a latch-receiving projection (not shown) to retain the trunk lid 14 in a locked position. The trunk-latching mechanism 22 is further provided with a rotatable latch release 32 for operatively releasing the locking latch 30 from the latch-receiving projection (not shown) in order to permit the trunk lid 14 to be opened.

This invention encompasses a frangible tail extension member 36 interconnecting the lock cylinder 18 and the latch release 32, so that when the lock cylinder 18 is rotated against the force of the biasing spring 20, the tail extension member 36 will transfer this movement and will thus rotate the release 32. The frangible tail extension member 36 is constructed of plastic or other resinous base synthetic material which will be readily breakable under tensile stress and yet have sufficient torsional strength to rotate the latch release 32. It should also be apparent to those skilled in the art that the tail extension member 36 may also be fabricated of other materials or metal alloys which may be heat treated to obtain a brittleness such that it will be fracturable under a specific tensile load yet maintain torsional strength. The importance of this frangibility for the tail extension member 36 will be further discussed herein.

The tail extension member 36 as shown in FIGS. 4, 5, 7, 8 and 9 is of rectangular transverse cross section and has been provided with a zigzag section 38, forming angular stress concentration portions 40 whereat the tail extension member 36 will be fracturable under tensile load. The length, height and width of the tail extension member 36 will be determined by the space between the trunk-latching mechanism 22 and the lock cylinder 18 and also by the size of a slotted passageway 34 in the release 32; the dimensions of the zigzag section 38 for a typical 6 ½-inch long tail extension member will be approximately ¾ of an inch on either side, the middle dimension being 1 ¼ inches. These dimensions will, of course, vary with the stock material and mechanical properties of the same and can be empirically determined such that fracture will occur under predetermined tensile load.

A lock-cylinder-receiving end 42 of the tail extension member 36 is provided with a notch 44 and forms a flexible coupling with the lock cylinder 18 which has a bifurcated end portion 46 adapted to receive the notched portion 44. The helical coil biasing spring 20 concentrically surrounds the bifurcated portion 46 and several convolutions thereof pass through the notch 44. A latch-release-receiving end 48 of the tail extension member 36 contains a plurality of parallel transverse grooves 50 positioned on both sides of the tail extension member 36 which run longitudinally along said member toward the zigzag section 38. Registered grooves 50 provide weakened sections to facilitate the severing of the tail extension member 36 at a desired length. In order to secure the latch-release-receiving end 48 within the latch release 32, a clamping ring 52 having a slotted aperture 54 is positioned over the latch-release-receiving end 48 of the tail extension member 36 which will project outwardly from the slotted passageway 34 on one side of the latching mechanism 22. A setscrew 56 passing through the clamping ring 52 locks the clamping ring 52 to the latch-release-receiving end 48. A similar clamping ring indicated by the reference numeral 52' and having a slotted aperture 54' and setscrew 56' is positioned on the opposite side of the latching mechanism 22. The clamping ring 52 will secure the tail extension member 36 within the latch release 32 and will prevent removal of the fractured tail extension member by pushing same out of the latch release 32; the clamping ring 52' will prevent removal of the fractured tail extension member by pushing same out of latch release 32. Thus the fractured tail extension member will prevent operation of the latch release 32 by insertion of a screwdriver.

It should thus be evident from the foregoing description of the antitheft lock device that if the lock cylinder 18 and housing 12 are pulled from the vehicle body by means of pliers or other clamping devices 60, an axial tensile stress will be exerted on the tail extension member 36 which is held fast between the clamping ring 52 and the convolutions of the spring 20 which engage the notch 44. The tail member 36 will thus fracture, usually along the angular portions of stress concentration 40. The clamping rings 52 and 52' will prevent removal of the lock-cylinder-receiving end 48 of the tail extension member 36 thus preventing the insertion of a screwdriver or other similar instrument into the slotted passageway 34 so that the latch release 32 cannot be turned to open the latching mechanism 22.

It should be noted that the latching mechanism 22 is usually spaced from the lock cylinder 18 and the bifurcated end of the cylinder 18 is not in axial alignment with the passageway 34 on all applications. Thus a rigid connection between the passageway 34 and the bifurcated portion 46 is not practicable. A solution to this problem is discussed with reference to FIG. 5 which illustrates a modified embodiment of the tail extension member wherein the suffix "a" has been added to the reference numerals to indicate like parts of the previously described elements. Tail extension member 36a is made of a similar material as the tail extension 36 previously described and also contains a zigzag section 38a and a notch 44a. However, this embodiment has been provided with pivotal connections 62 and 62'. The pivotal connections 62 and 62' are positioned on opposite sides of the zigzag section 38a and are the pivotal axes thereof, are placed at an angle of 90° to each other so as to provide for universal movement of the tail extension member 36a. A yoke 64 is adapted to receive a tab portion 66 as shown in FIG. 6. The yoke 64 and tab 66 include aligned bores which receive a pivot pin 68, which pivotably holds the tab 66 within the yoke 64. The ends of the pin 68 are suitably peened for captive retention. The pivotal connection 62 provides for rotation about a pivot pin 68' which passes through aligned bores in a bifurcated end of the zigzag section 38 and an abutting end of the cylinder-receiving portion 48.

Another means for providing a flexible tail extension member is shown in FIG. 7 which illustrates a further modification of the tail extension member hereinafter referred to as 36b, like numerals being used to represent like parts in various embodiments shown and the suffix "b" used to indicate the particular embodiment shown in FIG. 7. The lock-cylinder-receiving end 42b has been canted such that when the notch 44b is engaged within the bifurcated portion 46 of the lock cylinder 18, the tail extension member 36b will be properly aligned with the slotted passageway 34 and insertable within the latch release 32. Furthermore, in this embodiment sufficient clearance is provided in the slot of the bifurcated portion 46 so that movement of the end 42b within the slot is permitted while the tail 36b still transmits a torsional force.

Increased freedom of movement for aligning the tail extension member may be provided as in FIG. 8 which illustrates yet another embodiment of the tail extension member 36c, like numerals being used to represent like portions in the various embodiments the suffix "c" used to designate like parts in this particular embodiment as shown in FIG. 8. A pivotal connection 62c is provided in this embodiment. The connection 62c is in fact, a universal joint having two yokes 64c and 66c interconnected by two pins 68c and 72 which are crossed.

Another pivotal connection is illustrated in FIG. 9 which shows an additional modification of the tail extension member, with like numerals being used to represent like parts in various embodiments shown and with the suffix "d" used to indicate parts in the particular embodiment shown in FIG.. 9. A pivotal connection 62d in this modification is provided by a transverse hole 74 passing through the tail extension member 36d preferably in the lock-cylinder-receiving end 42d thereof. A bushing 76 preferably made of tetrafluoroethylene, brass or other suitable bearing material is positioned in the transverse hole 74. The cylinder-receiving end 42d is mounted to the lock cylinder 18 within the slot of the bifurcated portion 46 in a manner similar to that described with reference to FIG. 4 but one end 21 (see FIG. 4) of the biasing spring 20 passes radially through the transverse hold 74 and thereby provides a pivotal connection.

The above-cited embodiments are intended as exemplary only and while they have described the invention with specific embodiments further modifications will be apparent to those skilled in the art.

What I claim is:

1. An antitheft lock device locking system comprising a lock cylinder housing mounted in a body, a lock cylinder rotatably positioned within the housing, a latching mechanism spaced from the lock cylinder, frangible tail extension insertable into the latching mechanism for operating same, flexible coupling means for attaching said tail extension to the lock cylinder, retaining means for securing said tail extension within the latching mechanism such that upon unauthorized forcible removal of the lock cylinder and housing from the vehicle body, the frangible tail extension will fracture leaving a portion thereof within the latching mechanism to thereby prevent the insertion of a burglary tool into said latching mechanism to operate same.

2. An antitheft lock device as claimed in claim 1, wherein the frangible tail extension has a latch-release-receiving end and a lock-cylinder-receiving end and further comprising a zigzag section intermediate said ends defining at least one angular stress concentration portion whereat said tail extension will be fracturable upon the application of an axial tensile force sufficient to remove the cylinder housing from the body.

3. An antitheft lock device as claimed in claim 2, wherein the coupling means is flexible and comprises a notch formed in the lock-cylinder-receiving end of the tail extension member, and a bifurcated portion on said lock cylinder for engagement with the lock-cylinder-receiving end and cooperating means engaging the notch.

4. An antitheft lock device as claimed in claim 3, further including a biasing spring for rotating the lock cylinder to an idle position and also for retaining the lock-cylinder-receiving end of the tail extension member within the bifurcated portion.

5. An antitheft lock device as claimed in claim 4, further including a rotatable latch release within the latching mechanism, said latch release having a slotted opening accommodating the latch-release-receiving end of the tail extension member.

6. An antitheft lock device as claimed in claim 5, wherein the retaining means includes a clamping ring positioned on the tail extension adjacent the latch release for retaining said member within the latch release.

7. An antitheft lock device as claimed in claim 6, wherein a clamping ring is positioned between the latch release and the lock cylinder, the latch release end of the tail extension member extends through the latch release and a further clamping ring is positioned between the latch release end and the latch release.

8. An antitheft lock device as claimed in claim 7, wherein the tail extension member contains at least one pivotal connection for providing pivotal movement for the tail extension to permit alignment with the latch release.

9. An antitheft lock device as claimed in claim 8, wherein the tail extension member contains two pivotal connections on opposite sides of the zigzag section and disposed at 90° to each other to thus provide universal movement for the tail extension movement.

10. An antitheft lock device as claimed in claim 9, wherein the clamping ring includes a slotted opening, the tail extension member being positioned within said opening and a setscrew within the clamping ring bearing against the tail extension member.